United States Patent [19]
Tamaki et al.

[11] Patent Number: 5,749,336
[45] Date of Patent: May 12, 1998

[54] INTAKE VALVE CONTROL SYSTEM FOR INTERNAL COMBUSTION ENGINE

[75] Inventors: Shigeo Tamaki; Shigeru Tokumoto, both of Hitachinaka, Japan

[73] Assignees: Hitachi, Ltd.; Hitachi Car Engineering Co., Ltd., both of Japan

[21] Appl. No.: 717,249

[22] Filed: Sep. 20, 1996

[30] Foreign Application Priority Data

Sep. 20, 1995 [JP] Japan .................. 7-241376

[51] Int. Cl.$^6$ .................................. F02D 9/08
[52] U.S. Cl. .................................. 123/337
[58] Field of Search .................. 123/337, 403, 123/391; 251/305

[56] References Cited

U.S. PATENT DOCUMENTS

| | | | |
|---|---|---|---|
| 4,094,289 | 6/1978 | Wessel et al. | 123/337 |
| 4,474,150 | 10/1984 | Foley et al. | 123/337 |
| 4,491,106 | 1/1985 | Morris | 123/337 |
| 4,905,647 | 3/1990 | Kizer et al. | 123/337 |
| 4,909,211 | 3/1990 | Cook et al. | 123/337 |
| 5,315,975 | 5/1994 | Hattori et al. | 123/337 |
| 5,374,031 | 12/1994 | Semence et al. | 251/305 |
| 5,465,696 | 11/1995 | Gmelin | 123/337 |

FOREIGN PATENT DOCUMENTS 5-296067  11/1993  Japan .................. 123/337

*Primary Examiner*—Raymond A. Nelli
*Attorney, Agent, or Firm*—Evenson, McKeown, Edwards & Lenahan, P.L.L.C.

[57] ABSTRACT

An intake valve control apparatus for an internal combustion engine eliminates adverse effects due to accumulation of deposit materials downstream of the throttle valve to always ensure a smooth movement of the throttle valve. The apparatus has a body member forming an intake air passage and a throttle valve rotatably mounted therein. The throttle valve has a first outer circumference which rotates toward the upstream side thereof and a second outer circumference which rotates toward the downstream side thereof. A wall surface inside the body member opposite the first outer circumference of throttle valve is spherical, and wall surface of the body member opposite the second outer circumference of the throttle valve is cylindrical.

10 Claims, 5 Drawing Sheets

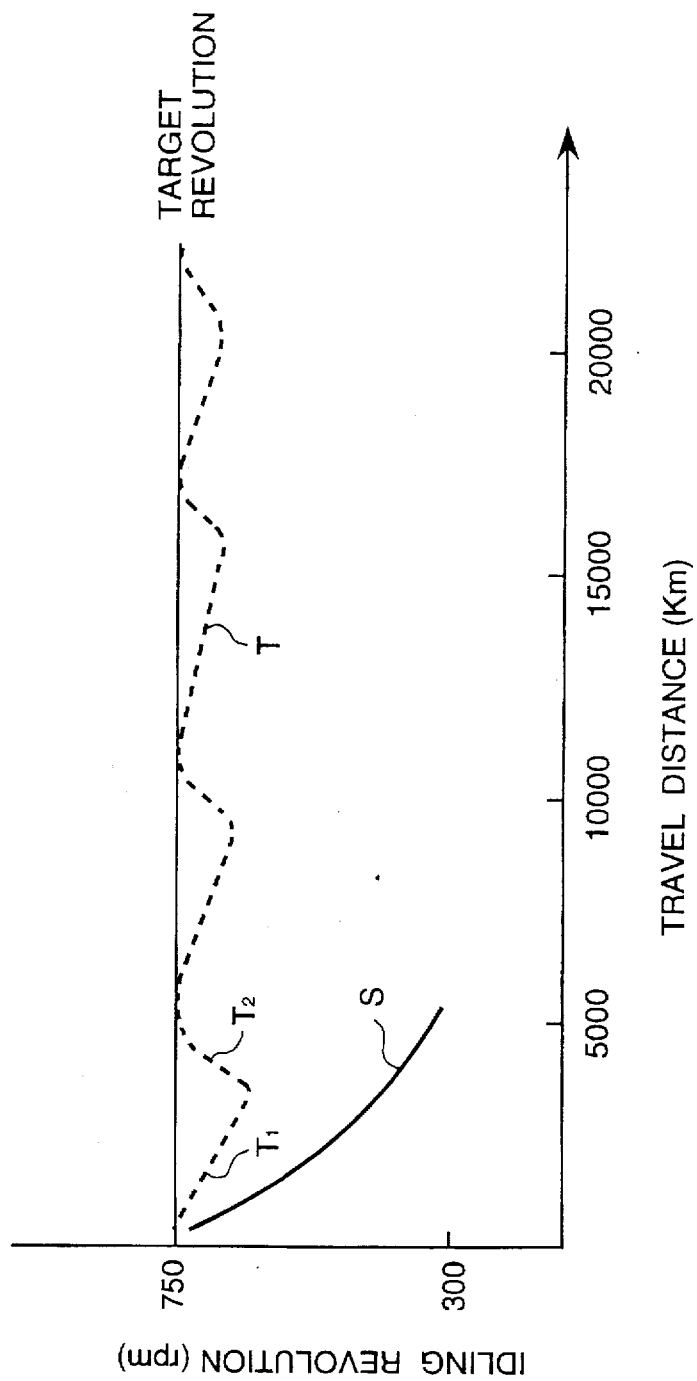

INTAKE VALVE CONTROL SYSTEM FOR INTERNAL COMBUSTION ENGINE

BACKGROUND OF THE INVENTION

The present invention relates to an intake valve control system for an internal combustion engine, and in particular it relates to an intake valve control system for an internal combustion engine suitable for use with a multipoint fuel injection system.

As a prior art intake valve control system, there is one as disclosed in JP-A Laid-Open No. 5-296067, of which the hollow main body has an inlet port which is connected to an intake pipe in the upstream, and an outlet port which is connected to an intake manifold in the downstream. Further, a throttle shaft on which a throttle valve is mounted is supported by the hollow main body penetrating therethrough.

The throttle valve mounted on the throttle shaft is rotatable together with the throttle shaft about the axial center thereof, and is provided with a first outer circumference which rotates toward the upstream and a second outer circumference which rotates toward the downstream. On the other hand, inside the main body there are formed a first wall surface opposite to the first outer circumference of the throttle valve, and a second wall surface opposite to the second outer circumference of the throttle valve. With respect to the shape of the first and the second wall surfaces, it is known to provide their wall surfaces in a spherical shape since it is disclosed in JP-A Laid-Open No. 5-296067.

Therefore, in the prior art arrangement, when the throttle valve is at a complete close position (idling position), spaces between the first outer circumference of the throttle valve and the first wall surface opposite thereto, and between the second outer circumference of the throttle valve and the second wall surface opposite thereto are very narrow allowing only a very slight opening therebetween or almost in a state of contact. Further, when the throttle valve is caused to rotate from the close point to a given point of angle, distances between these outer circumferences and the wall surfaces are maintained constant.

When the throttle valve rotates, an opening area in an suction passage increases by an increased portion in accordance with a displacement due to the rotation, thereby an intake air flow through the throttle body increases slightly accordingly. When the rotation of the throttle valve exceeds a predetermined angle, since the outer circumference of the valve will traverse past the area of the wall surface facing thereto which is formed spherical in the suction passage, the opening area in the suction passage increases rapidly with the rotation of the throttle valve, thereby exhibiting a characteristic of a rapid increase in the intake air flow with respect to a throttle opening.

Problems associated with these prior art intake valve control system for internal combustion engines when used in conjunction with a multipoint fuel injector include accumulation of deposit substances due to spitting from the engine, EGR gas, PCV gas and the like on the surfaces in the body in the downstream thereof so that the gap between the throttle valve and the spherical surfaces of the body member easily become clogged. A similar phenomenon takes place likewise in a carburetor system, a single point fuel injector system or the like, however, since gasoline is supplied in the upstream of the throttle valve in these systems, these accumulated deposit substances will be flushed thus preventing accumulation thereof which will clog the passage between the spherical surfaces of the throttle valve and the body itself. However, in the case of the multipoint fuel injection system, since its fuel injector is provided in the intake manifold disposed in the downstream thereof, such flushing by gasoline is not possible.

In the multipoint fuel injection system, these deposit substances accumulate in a gap between the surfaces of the throttle valve and the body itself. Further, these deposits which are synthesized from carbon, hydrogen and sulfur compositions have a tar-like state which is viscous at high temperatures but solidifies at low temperatures, therefore causing a problem by impeding a smooth operation of the throttle valve, in particular, at the time the temperature is low.

SUMMARY OF THE INVENTION

The main object of the invention is to provide an air-intake valve control unit for internal combustion engines which ensures a smooth operation of the throttle valve even if deposits accumulate in the downstream of the throttle valve by effectually eliminating the adverse effect thereof.

In order to accomplish the aforementioned object of the invention, it is contemplated to provide an intake valve control apparatus for an internal combustion engine which is comprised of a throttle body member which forms an intake passage, and a throttle valve mounted rotatably in the body member which has a first outer circumference which rotates in the direction of upstream of the throttle body and a second outer circumference which rotates in the direction of downstream of the throttle body, wherein a first wall surface of the body member which is opposite to the first outer circumference of the throttle valve is formed spherical while a second wall surface of the body member which is opposite to the second outer circumference of the throttle valve is formed cylindrical.

In the aforementioned intake valve control apparatus for internal combustion engines, a distance L between the first outer circumference of the throttle valve and the inner surface of the body member opposite to the first outer circumference of the throttle valve in an idling condition of the throttle valve is adapted to be equal to a distance L between the second outer circumference of the throttle valve and the inner surface of the body member opposite to the second outer circumference of the throttle valve.

In the above-mentioned intake valve control apparatus for internal combustion engine, the aforementioned distance L is preferably defined to be 5 μm to 10 μm.

In another aspect of the aforementioned intake valve control apparatus for internal combustion engines, a distance L1 defined between the first outer circumference of the throttle valve and the inner surface of the body member opposite to the first outer circumference of the throttle valve in an idle condition of the throttle valve is preferably greater than a distance L2 defined between the second outer circumference of the throttle valve and the inner surface of the body member opposite to the second outer circumference of the throttle valve.

In the aforementioned intake valve control apparatus for internal combustion engines, the above-mentioned distance L1 is preferably defined to be from 50 μm to 100 μm, and L2 to be from 5 μm to 10 μm.

In still another aspect of the invention, preferably a coating layer is formed in the downstream of the throttle valve in the aforementioned intake valve control for internal combustion engines, the coating layer comprising a material having a lubricating property and low friction coefficient.

In the aforementioned air intake valve control for internal combustion engines, the above-mentioned coating layer is formed preferably on an internal surface of a shaft bearing housing which houses the above-mentioned throttle shaft which mounts the throttle valve thereon and is rotatable relative to the body member, on the outer circumference surfaces of the throttle valve on the side of the downstream of the throttle valve, and on the internal surfaces of the body member opposing the outer circumference of the throttle valve in the downstream of the throttle valve.

In the aforementioned intake valve control apparatus of the invention, a thickness of the coating layer described above preferably has a thickness equal to or greater than a distance of a gap between the outer circumferences of the throttle valve and the body member.

Still further, in the aforementioned intake valve control of the invention, preferably, there are provided a motor to actuate the throttle valve, a sensor to detect a rotation angle of the throttle valve, and a control means which in response to a quantity of movement of an acceleration pedal is adapted to output a control command to the motor and also control the rotation of the motor in response to an output signal from the sensor.

According to still another aspect of the invention, preferably, a multipoint fuel injection system is connected in the downstream of the throttle valve.

Now, implementation of the invention will be described in the following. By providing such that an inner surface of the body member opposite to the first outer circumference of the throttle valve is formed spherical, and an inner surface of the body member opposite to the second outer circumference of the throttle valve is formed cylindrical, whereby the second outer circumference opposite to the cylindrical surface of the body member is adapted to move away from the cylindrical surface with the rotation of the throttle valve since a gap therebetween widens with the rotation, thereby, even if deposits accumulate on the surfaces in the downstream of the throttle valve, there occurs no trouble due to biting or sticking of the throttle valve to the deposit, which have been normally observed in the prior art, thereby ensuring a smooth operation of the throttle valve.

Further, by arranging such that a distance L between the first outer circumference of the throttle valve and the first internal surface of the body member opposite to the first outer circumference is adapted to equal to a distance L between the second outer circumference of the throttle valve and the second internal surface of the body member opposite to the second outer circumference when the throttle valve is in idle condition, it is ensured that air flow can be reduced in a region where throttle opening is small.

According to still further aspect of the invention, assuming a distance between the first outer circumference of the throttle valve and the internal wall surface of the body member opposite to the first outer circumference to be L1, and a distance between the second outer circumference of the throttle valve and the internal surface of the body member opposite to the second outer circumference to be L2, and adapting L1 to be greater than L2, it is ensured for the throttle valve to operate smoothly since influence due to deposits on the sides of the first outer circumference is eliminated.

More specifically, by adapting distance L1 to be 50 μm to 100 μm, and distance L2 to be 5 μm to 10 μm, a smooth operation of the throttle valve is ensured.

Further, by forming a coating layer made of a lubricating material having a low friction coefficient on the surface on the side of the downstream of the throttle valve, a gap between the throttle valve and the body member can be reduced to provide a small opening therebetween at an initial state.

Still further, in order to reduce the opening more effectively, coating layers are formed in regions including inside of the shaft bearing housing which houses the bearing of the throttle shaft which mounts the throttle valve thereon, the bearing supporting the shaft rotatably to the body member, a part of the outer circumferential area of the throttle valve on the side facing the downstream of the throttle valve, and a part of the internal surface of the body member opposite to the outer circumference of the throttle valve in the vicinity of the downstream of the throttle valve.

Further, in order to reduce the opening at the initial state, each thickness of the coating layers is provided to be equal to or greater than a thickness of the gap between the outer circumference of the throttle valve and the body member.

According to still another aspect of the invention having a motor which actuates the throttle valve, a sensor which detects a rotation angle of the throttle valve, further by providing a control means which in response to a quantity of movement of the acceleration pedal produces a control command to the motor, and at the same time controls the rotation of the motor on the basis of an output signal from the sensor so that there occurs no trouble of biting or sticking of the throttle valve to the deposits thereby a smooth control of the opening of the throttle valve is ensured using a motor having a small torque.

Further, adverse effect due to deposits accumulated in the downstream of the throttle valve which often results in when a multipoint fuel injection system is connected in the downstream can be eliminated substantially.

BRIEF DESCRIPTION OF THE DRAWINGS

The invention will be more particularly described with reference to the accompanying drawings, in which:

FIG. 8 is a diagram showing idle rpm changes relative to travel distances of another embodiment of the invention.

PREFERRED EMBODIMENTS

One embodiment of the invention will be described with reference to accompanying drawings of FIGS. 1 to 3 in the following.

Figure 1:
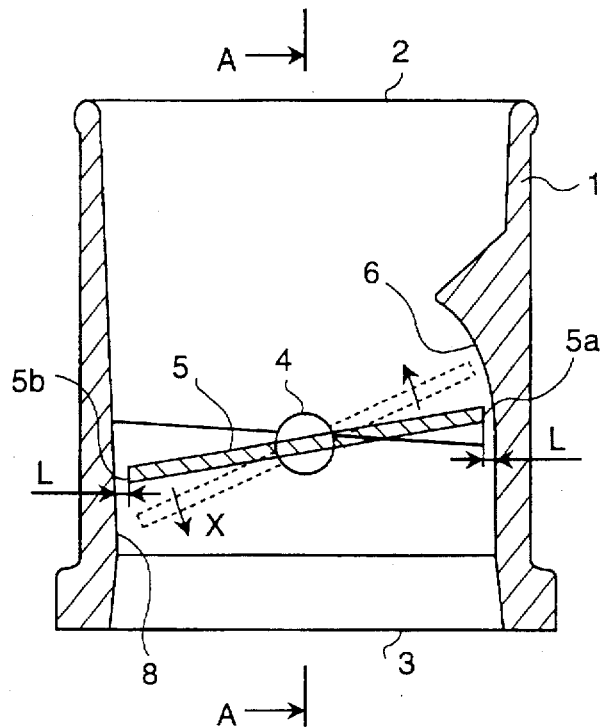
FIG. 1 is a cross-sectional view of a key element of air intake control valve for internal combustion engines according to one embodiment of the invention.

FIG. 1 is a cross-sectional view of a key component of an intake control valve for internal combustion engines according to one preferred embodiment of the invention.

A hollow body member 1 has upper stream inlet 2 to be coupled to an inlet pipe and down stream outlet 3 to be coupled to an intake manifold. Throttle shaft 4 which mounts throttle valve 5 thereon penetrates laterally through hollow body member 1 and is supported by a bearing which is not shown.

Throttle valve 5 is mounted on throttle shaft 4, which can rotate in the direction of arrow. A solid line drawn across inside the hollow body indicates a position of the throttle valve at which the throttle valve is in a full close state (idle condition).

Throttle valve 5 has a first outer circumference 5a which rotates toward the upstream direction, and a second outer circumference 5b which rotates toward the downstream direction. On the other hand, inside the body member and along an intake air passage wall there are provided a first wall surface 6 which is opposite to the first outer circumference 5a of the throttle valve, and a second wall surface 8 which is opposite to the second outer circumference 5b of the throttle valve.

First wall 6 which defines an opposite wall surface opposite to the first outer circumference 5a of throttle valve 5 which rotates from the full close position depicted by the solid line to a position depicted by broken lines rotated by angle θ, has a spherical surface. Namely, assuming a gap between the first outer circumference 5a of the throttle valve and a spherical first wall surface 6 to be L at the position of the solid line which indicates the idle position, a distance between the first outer circumference 5a and the spherical first wall surface 6 at the position of broken lines of the throttle valve rotated by angle θ remains constant at L. By way of example, gap L is preferably from 5 to 10 μm. As for angle θ, the value of which may change depending on characteristics of the engine required, however, its spherical surface may be formed to cover a range of angles preferably from 10 to 35 degrees. By way of example, since the main feature of the invention does not reside in this spherical surface wall, angle θ is not critical.

Further, second wall surface 8 is provided in a cylindrical shape. At the idle position indicated by the solid line, a gap L between second outer circumference 5b of the throttle valve and second wall surface 8 of a cylindrical shape equals L which is the distance between the first outer circumference 5a of the throttle valve and the first wall surface 6 of spherical shape. However, with the rotation of the throttle valve 5, the gap L between the second outer circumference 5b and the second wall surface 8 increases.

Strictly speaking, the shape of throttle valve 5 is not symmetrical relative to the axial center of the throttle shaft 4, but it may be said to have almost similar shape relative to the axial center of the throttle shaft 4.

Deposit substances due to spitting from the engine or the like tend to accumulate on the surfaces of throttle valve 5 on the side thereof facing the downstream of throttle valve 5 as well as of the internal wall surface of throttle body 1 in the downstream of throttle valve 5. According to the prior art, since the wall surface of the body member 1 facing the second outer circumference 5b of the throttle valve 5 is formed spherical, the gap between the second outer circumference of the throttle valve and the second wall surface of the body member was maintained relatively small. Therefore, there occurred a problem that when deposits were accumulated in the vicinity of the second outer circumference of the throttle valve, and when the throttle valve was pivoted in the direction of an arrow X, there occurred a phenomenon of biting in the gap between the second outer circumference of the throttle valve and the second wall surface of the body member.

However, through the provision of the second wall surface in the cylindrical form, since the distance between the second outer circumference 5b of the throttle valve 5 and the second wall surface 8 of the body member which is cylindrical increases with rotation of the throttle valve 5, there will occur no problem of biting due to deposit substances which has been observed in the prior art, thereby ensuring a smooth operation of the throttle valve.

Figure 2:
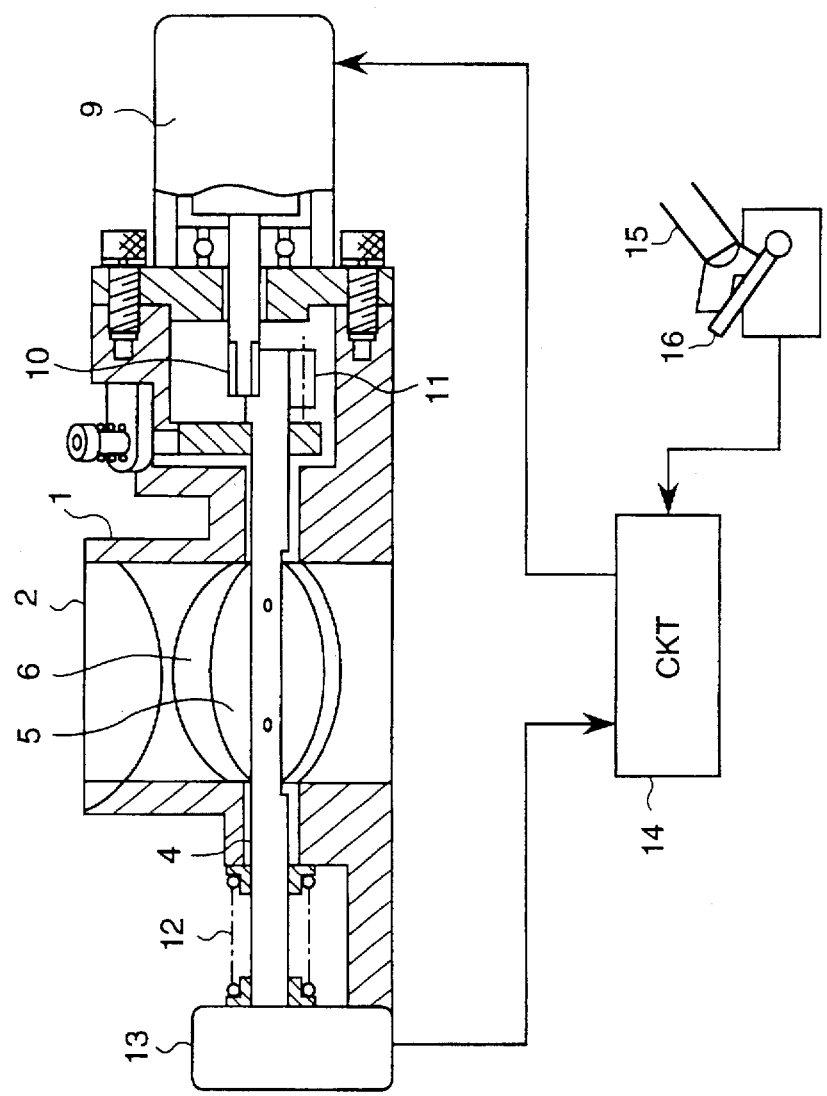
FIG. 2 is a cross-sectional view of the key element of air intake control valve for internal combustion engines according to the one embodiment of the invention taken along line A—A of FIG. 1.

FIG. 2 is an elevation cross-sectional view cut out along line A—A of FIG. 1 of an intake air controller for internal combustion engine of the one embodiment of the invention.

Air flow through the air cleaner is measured its amount in a gap of intake air passage between internal wall 6 and throttle valve 5, and is supplied to the engine. Throttle valve 5 is mounted on throttle shaft 4. To one end of throttle shaft 4 is attached gear 11, which gear 11 is in mesh with gear 10 which is attached to a rotor shaft of motor 9.

When driver 15 puts on pedal 16, a quantity of displacement of pedal 16 is detected by controller 14, and in response to the detected displacement a control command to actuate motor 9 is produced to the motor 9. Torque of the motor 9 is reduced by gears 10 and 11 and is transferred to throttle shaft 4 to rotate throttle valve 5 to a desired angle.

On the other end of throttle valve 4 is mounted a throttle angle sensor for detecting a rotation angle of throttle valve 5. The rotation angle detected is sent to controller 14 to feedback to a control command to be given to motor 9 such that throttle valve 5 is precisely rotated to the desired angle.

Further, throttle shaft 4 is provided with throttle spring 12, which throttle spring 12 serves to prevent backlash in gears 10 and 11, and to close the throttle valve when a smooth operation of the motor is not ensured due to unknown reason at the time of deceleration.

Due to a necessity to assemble the intake control system in a more compact size, a smaller size of motor is eventually required, thereby resulting in a decreased output torque thereof ensuring only a minimum torque to drive the throttle valve according to the prior art. Thereby, under the condition where the biting occurs due to the deposit substances from the engine which accumulate on the throttle valve and the internal wall surface of the intake passage, a smooth operation of the throttle valve is prevented. However, through the provision of the cylindrical wall surface on the second internal wall of the body member opposite to the second outer circumference of the throttle valve, such problem of biting due to accumulated deposits can be eliminated, and a smooth operation of the throttle valve can be ensured even in an electronic control throttle system in which the throttle valve is actuated using a small motor.

Now, with reference to FIG. 3, a relationship of a quantity of air flow admitted through the throttle valve with respect to an opening of the throttle valve will be described.

Figure 3:
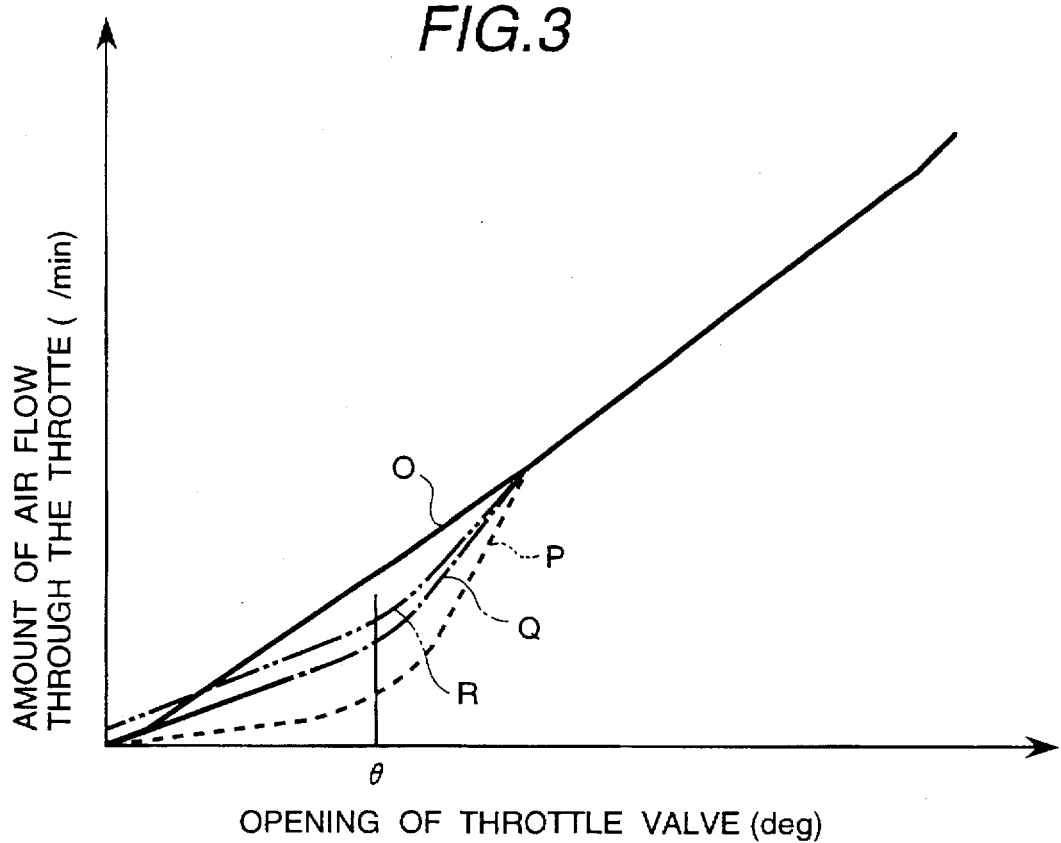
FIG. 3 is a diagram indicating a relationship of air flow admitted through the throttle valve relative to openings of the throttle valve of one embodiment of the invention in comparison with the prior art intake valve control apparatus.

FIG. 3 is a schematic diagram depicting relationships between openings of the throttle valve and amounts of the air flow admitted through the openings in intake control systems for internal combustion engine embodying the invention and according to the prior art.

In the drawing of FIG. 3, straight solid line O represents a prior art example for comparison in which the amount of intake air admitted through the throttle valve changes linearly relative to changes in the opening of the throttle valve.

Curve P in dotted lines represents another prior art example having a spherical shape both on the first and second internal surfaces of the body member facing the first and the second outer circumferences of the throttle valve in which admitted air flow passing through the throttle valve has a characteristic such that it increases very slowly relative to a constant change in the opening of the throttle valve until angle θ, and increases abruptly exceeding angle θ.

In contrast, curve Q in chain line which represents an example of results obtained by an internal combustion engine intake valve control unit embodying the invention has a characteristic such that a quantity of air flowing through the throttle valve changes more linearly relative to changes of openings of the throttle valve than the case of curve P. Since the second internal wall surface of the body member is formed cylindrical while the first wall surface thereof is formed spherical, a rate of changes of admitted air flow through the throttle valve becomes greater than for curve P at least in a region of throttle valve opening from angle 0 to θ. Therefore, acceleration performance of curve Q is substantially improved over the prior art internal combustion engine intake control depicted by curve P. In addition, the problem of biting associated with the prior art due to accumulated deposits is eliminated, thus ensuring a smooth operation of the throttle valve.

By way of example, curve R in chain double-dashed line, which relates to still another embodiment of the invention, will be described later.

Now, another embodiment of the invention will be described with reference to FIGS. 4 and 5.

Figure 4:
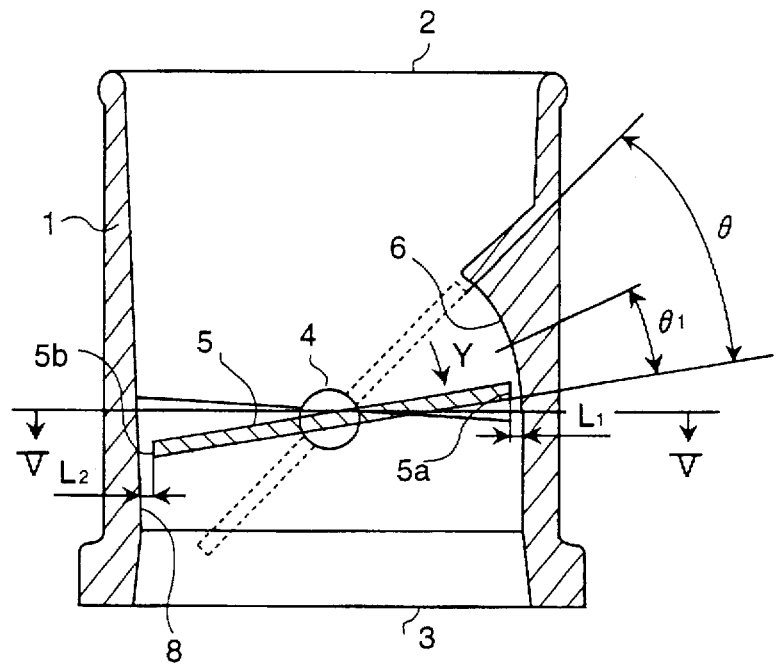
FIG. 4 is a cross-sectional view of a key element of intake valve control for internal combustion engines according to another embodiment of the invention.
Figure 5:
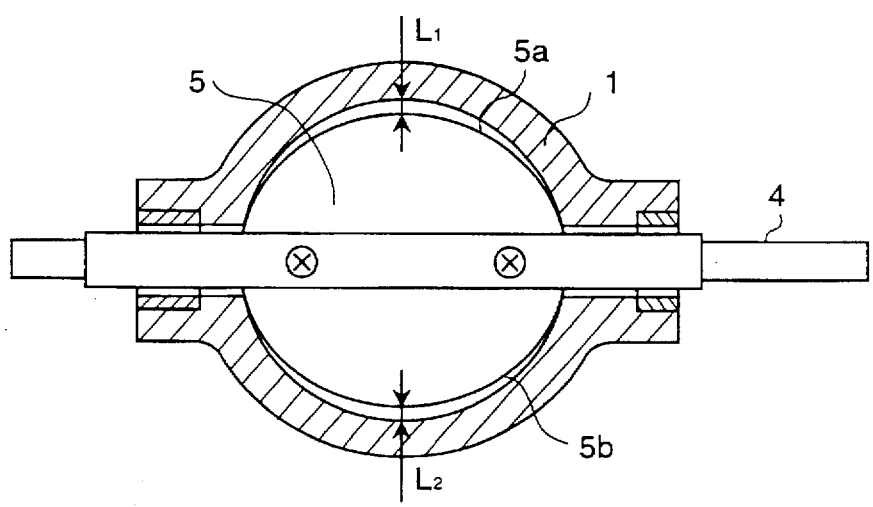
FIG. 5 is a plan view of FIG. 4 cut along line V—V.

FIG. 4 is a cross-sectional view of a key component of an internal combustion engine intake control unit according to another embodiment of the invention. FIG. 5 is a plan view of FIG. 4 cut along line V—V.

Hollow body member 1 having a hollow is provided with upstream inlet 2 which is connected to intake piping, and downstream outlet 3 which is connected to an intake manifold. Throttle shaft 4 penetrates through the hollow portion of the body member 3 supported by bearing which is not shown, on this throttle shaft 4 is mounted throttle valve 5.

Throttle valve 5 is mounted on the throttle shaft which is rotatable in the direction of arrow about the axial center thereof. A horizontal solid line in FIG. 4 represents a position of throttle valve in a full close (idling) condition.

Throttle valve 5 is provided with a first outer circumference 5a which rotates in an upstream direction, and a second outer circumference 5b which rotates in a downstream direction. On the other hand, on the intake passage wall inside the body member there are formed a first wall surface 6 which is opposite to the first outer circumference 5a of the throttle valve and a second wall surface 8 which is opposite to the second outer circumference portion 5b of the throttle valve.

The first wall surface 6 defines a portion of the body member which is opposite to the first outer circumference 5a and is provided in a spherical shape until throttle valve 5 rotates from its full close position depicted by the horizontal solid line to a position rotated by angle θ depicted by broken lines. Namely, assuming a distance at idling condition depicted by the solid line between the outer circumference 5a of throttle valve 5 and the first spherical wall surface 6 to be L1, a distance at a position rotated by angle θ therebetween depicted by broken lines is maintained constantly at L1.

In this another embodiment, gap L1 is defined to be, for example, from 50 to 100 μm, which is wider than the gap in FIG. 1. Namely, angle θ which may vary depending on characteristics of the engine required as described above is preferably around 30 degrees. Accumulation of deposit substances due to engine spitting, EGR gas or PCV gas will not take place at idling position of throttle valve 5 depicted by the horizontal solid line, but will take place when throttle valve 5 exceeds angle θ1 indicated in the drawing of FIG. 4, where θ1 is about 20 degrees. Therefore, when there occurs engine spitting or the like with the throttle valve opened, deposits will accumulate also on portion of the wall surface 6 of the body member 1 opposite to the first outer circumference 5a of throttle valve 5 which is rotated by angle θ1. Under such condition with accumulation of deposits on the portion of wall surface 6, when throttle valve 5 is closed by rotating in the direction of arrow, the throttle valve is jammed on the way due to the accumulated deposit substance. In order avoid such occurrence, gap L1 between the first outer circumference 5a of the throttle valve 5 and the spherical first wall surface 6 of the body member is broadened to be 50 to 100 μm, for example.

Through the provision of such wall arrangement described above, it is possible to eliminate occurrence of biting or jamming in the gap between the first outer circumference 5a of throttle valve 5 and the spherical first wall surface 6 irrespective of accumulation of deposit substances due to engine spitting or the like, thereby ensuring a smooth operation of the throttle valve.

Further, the second wall surface 8 embodying the invention has a cylindrical shape. In an idling condition depicted by the horizontal solid line, a gap between the second outer circumference 5b of throttle valve 5 and the second wall surface 8 of the body member which is cylindrical is defined to be L2. In this embodiment, L2 is preferably from 5 to 10 μm, for example. However, with rotation of throttle valve 5, this gap L2 widens gradually.

Strictly speaking, the shape of throttle valve 5 relative to the axial center of throttle shaft 4 is not symmetrical, however, it may be said to have almost the same shape.

Deposit substances due to engine spitting or the like accumulate on the surface of throttle valve 5 on the side facing the downstream and on the internal surface of throttle body member 1 in the downstream of throttle valve 5. According to the prior art, since the shape of the second surface of the body member 1 opposite to the second outer circumference 5b of throttle valve 5 was spherical, the gap between the second outer circumference of the throttle valve and the second wall surface of the body member was maintained constant at a small distance. Therefore, when deposits accumulate in the vicinity of the second outer circumference of the throttle valve, and when the throttle valve is rotated in the direction of arrow, a phenomenon of jamming between the second outer circumference of the throttle valve and the second wall surface of the body member.

However, through the provision of the second wall surface which is formed cylindrical according to the invention, since the gap between the second outer circumference 5b of the throttle valve and the cylindrical second wall surface 8 increases with the rotation of the throttle valve, the problem of biting due to accumulation of deposits associated with the prior art can be eliminated, thereby ensuring a smooth operation of the throttle valve.

Now, with reference to FIG. 3, the relationship of admitted air flow relative to the openings of the throttle valve in the intake valve control unit for internal combustion engine embodying the invention will be described more in detail.

In the drawing of FIG. 3, curve R in chain double-dashed line indicates a characteristic of an intake valve control unit of internal combustion engine embodying the invention in which the throttle valve transit air flow is adapted to change linearly relative to a change in opening of the throttle valve. Since the second wall surface of the body member is cylindrical while the first wall surface thereof is spherical, a rate of change of admitted air flow through the throttle valve in a range from 0 to θ of throttle opening becomes greater compared to curve P. Further, since the gap between the spherical wall surface of the body member and the outer circumference of the throttle valve is greater than the case of curve Q, amount of admitted air flow is slightly larger compared to curve Q.

Therefore, acceleration performance thereof is substantially improved in comparison with that of the prior art internal combustion engine intake controller indicated by curve P. In addition, no problem of jamming due to deposits will occur, thereby ensuring a smooth operation of the throttle valve.

Still another embodiment of the invention will be described with reference to FIGS. 6, 7 and 8 in the following.

Figure 6:
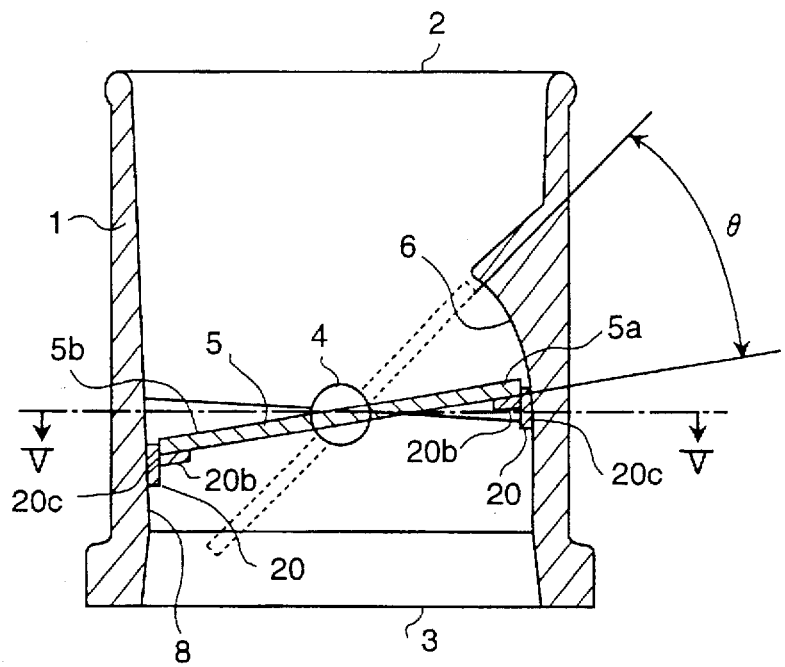
FIG. 6 is a cross-sectional view of a key element of an intake valve control for internal combustion engines according to still another embodiment of the invention.
Figure 7:
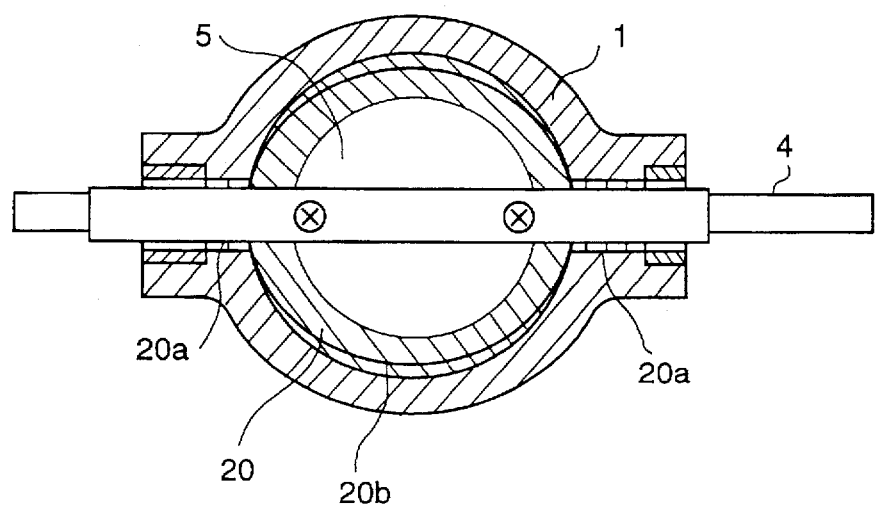
FIG. 7 is a plan view of FIG. 6 cut along line V—V.

FIG. 6 is a cross-sectional view in part of an internal combustion engine intake control unit of still another embodiment of the invention, and FIG. 7 is a plan view of FIG. 6 taken out along line V—V.

A hollow cylindrical body member 1 of the still another embodiment of the invention is provided with upstream inlet 2 which is connected to an intake piping, and a downstream outlet 3 which is connected to an intake manifold. Penetrating through this hollow cylindrical body 3 is provided a throttle shaft 4 supported by bearing which is not shown, on this throttle shaft 4 is mounted a throttle valve 5.

Throttle valve 5 mounted on throttle shaft 4 is rotatable about the axial center of the throttle shaft in the direction of arrow. A position of the throttle valve depicted by a horizontal solid line indicates a full close position (idling condition).

Throttle valve 5 is provided with a first outer circumference 5a which rotates in the direction toward the upstream, and a second outer circumference 5b which rotates in the direction toward the downstream. On the other hand, inside the body member and on the intake air passage wall thereof opposite to the throttle valve, there are formed a first wall surface 6 which is opposite to the first outer circumference 5a of the throttle valve, and a second wall surface 8 which is opposite to the second outer circumference 5b of the throttle valve.

First wall surface 6 the shape of which is spherical defines an extent of the internal wall surface of the body member which is opposite to the first outer circumference 5a and extends from a full close position depicted by the solid line to a position depicted by broken lines which is rotated by angle θ. Namely, assuming a gap between the first outer circumference 5a of throttle valve 5 and spherical first wall surface 6 to be L1 at the idle position depicted by the solid line, a gap therebetween after rotation of the first outer circumference 5a to the position depicted by the broken lines is maintained constant at L1. Although L1 is not actually indicated in FIG. 6, it represents the same gap as indicated in FIG. 4.

By way of example, this gap L1 is preferably 50 to 100 μm, which is broader than the values of the embodiment of FIG. 1. Namely, although it may vary depending on characteristics of the engine utilized, angle θ is approximately 30 degrees. Then, deposit substances due to spitting of the engine, EGR gas or PCV gas do not occur when throttle valve 5 is at the position of idling depicted by the solid line, but take place when throttle valve 5 advances to angle θ1 or beyond. Here, θ1 is preferably about 20 degrees. Thereby, when spitting from the engine or the like takes place with throttle valve 5 opened, a resultant deposit substance is allowed to adhere even to a part of wall surface 6 opposite to the first outer circumference 5a of body member 1 which is rotated by angle θ1. Under such condition with the deposit substance accumulated on the wall surface 6 corresponding to θ1, when throttle valve 5 is closed by rotating in the direction of arrow Y, there occurs a problem of jamming in the gap between the accumulated deposit and the throttle valve, blocking a smooth movement thereof. In order to prevent such occurrence of biting, gap L1 between the first outer circumference 5a of throttle valve 5 and the first wall surface 6 in spherical form is widened, for example, to 50 to 100 μm according to this embodiment of the invention.

Through the provision of such arrangement described above, even if deposit materials due to the spitting from the engine or the like are accumulated in the intake passage, jamming in the gap between the first outer circumference 5a of throttle valve 5 and the first wall surface 6 can be prevented thereby to ensure a smooth movement of the throttle valve throughout the engine operation.

Further, wall surface 8 is formed into a cylindrical shape. A gap, at idling position depicted by a solid line, between the second outer circumference 5b of throttle valve 5 and the second wall surface 8 having the cylindrical form, which is defined as L2, has a distance, for example, 5 to 10 μm. This gap L2, however, increases gradually with the rotation of throttle valve 5.

Strictly speaking, the shape of throttle valve 5 is not symmetrical relative to the axial center of throttle shaft 4, but may be regarded as having substantially the same shape.

Deposit materials due to engine spitting and the like accumulate on the surface of throttle valve 5 on the side facing the downstream and on the internal wall surface of throttle valve body member 1 in the downstream of throttle valve 5. According to the prior art, since the shape of the second wall surface of body member 1 which is opposite to the second outer circumference 5b of throttle valve 5 was formed spherical, a gap between the second outer circumference of the throttle valve and the second wall surface was maintained relatively narrow. Therefore, when deposit materials accumulate on the surfaces in the vicinity of the second outer circumference of the throttle valve, and when the throttle valve is rotated in the direction of arrow X, a problem of jamming occurred in the gap between the second outer circumference of the throttle valve and the second wall surface of the body member.

However, through the provision of the second wall surface which has a cylindrical form according to the invention, since the gap between the second outer circumference 5b of throttle valve 5 and the second wall surface 8 having the cylindrical form will increase with the rotation of throttle valve 5, the problem of biting due to the deposits associated with the prior art can be eliminated, thereby ensuring a smooth movement of the throttle valve.

Further, in this embodiment of the invention, layer 20 composed of a material such as molybdenum disulfide having a lubricating property and a low frictional coefficient is applied to the surfaces in the downstream of throttle valve 5. Areas of application of this type of layer 20 include internal area 20a in a bearing hole defined between throttle valve 4 and body member 1, outer circumference portion 20b of throttle valve 5 on the side toward the downstream thereof, and internal wall surface portions 20c on body member 1 which are opposite to the outer circumferences of throttle valve 5 and in the downstream of throttle valve 5.

Since gap L1 between the first outer circumference of throttle valve 5 and the internal wall surface of body member 1 opposite thereto was broadened, a quantity of admitted air flow is slightly increased as indicated by curve R in FIG. 3. Therefore, in order to ensure only a normal quantity of air flow which is indicated by curve Q in FIG. 3 to be admitted, layer 20 of the material having a lubricating property and low frictional coefficient has been coated. When, for example, molybdenum disulfide dissolved in a solvent is applied on the aforementioned area, then dried, the gap between the throttle valve and the internal wall surface of the body member will be eliminated. However, when throttle valve 5 is urged to rotate after drying of the layer, a gap with a distance of 5 to 10 μm will be formed between the throttle valve and the body member. Thereby, through the provision of such layer and processing, an initial gap therebetween can be reduced, to ensure the normal quantity of air flow indicated by curve Q in FIG. 3 to be supplied.

Since such a substance having a lubricating property and a low friction coefficient is applied as the layer, it will not cause jamming or biting even in a narrow interstice between parts in contact, thereby ensuring a smooth and preferred movement of the throttle valve.

The applied coating 20 having the lubricating property and low friction coefficient is not limited to molybdenum disulfide, and other materials such as graphite, Teflon or the like can be applied likewise within the scope of the invention.

A thickness of coating 20 is preferably 50 μm to 100 μm or more. This is related to the fact that the gap between the first outer circumference of throttle valve 5 and the first wall surface of the body member opposite thereto has a distance of 50 to 100 μm, thus, the thickness of the coating was set at a value adequate to fill the gap. Further, if the thickness of the coating were increased as thick as several mm, since such coating having such thickness will peel off at once it is not advantageous, rather a too thick coating will deprive the advantage to repeat a cycle of accumulation of deposits and peel-off of a part of the coating together with the deposits thereon.

Further, this coating of the layer 20 can be applied to the embodiment of FIG. 1, in this case a thickness of 5 to 10 μm or more will be sufficient.

Still further, the advantage of applying coating of layer 20 having a lubricating property and low friction coefficient on the surfaces in the downstream of throttle valve 5 will be described in detail with reference to FIG. 8.

FIG. 8 is a diagram indicative of changes of idle revolutions relative to travel distances by an internal combustion engine intake control unit of the still another embodiment of the invention.

Solid curve S in the drawing of FIG. 8 depicts a change in the number of revolutions at the time of idling of the engine from an initial setting of 750 rpm relative to travel distances when the engine was controlled by the prior art internal combustion engine intake control unit in which the internal surfaces of the body member opposite to the outer circumferences of the throttle valve were formed spherical and no coating of molybdenum disulfide was applied. With increasing of travel distance, the number of revolutions of the engine at the time of idling decreases as indicated in FIG. 8, and its idle revolution drops to 300 rpm when travel distance reaches about 5000 km, thus causing the engine to stop.

On the other hand, broken line T indicates changes in the number of revolutions of the engine at the time of idling relative to travel distances according to the embodiment of the invention. A portion of broken line T1 which covers a travel distance of approximately 4000 km shows a decreasing idle revolution reflecting the fact that the intake passage becomes narrower due to accumulation of deposits. Although it cannot be determined univocally depending on various conditions such as the type of engine, thermal conditions, and the like, however, in the case of a four cycle engine with a displacement of 2000 cc, for example, normally when a travel distance covers about 4000 km, a part of molybdenum disulfide layer peels off from the surface little by little. This peel off is effected by gasoline or volatile substances of engine oil in spitting from the engine which reacts with molybdenum disulfide. Together with peel off of a part of molybdenum disulfide from the surface of the coating layer, deposits accumulated on the surface of molybdenum disulfide are removed as well. Then, from 4000 to 5000 km of travel distance which is indicated by broken line T2, its idle revolution increases gradually. This is due to an increasing intake air flow admitted through the gap between the outer circumference of the throttle valve and the internal surface of the body member since the gap therebetween gradually widens as the part of molybdenum disulfide layer as well as the deposits thereon are peeled off little by little. Exceeding 5000 km of travel distance, the number of revolutions at the time of idling decreases slowly likewise from a restored initial condition since the intake air flow admitted decreases due to gradual accumulation of deposits. The number of revolutions of the engine at the time of idling varies depending on a specific travel distance as represented by curve T in broken lines due to the phenomenon described above. However, a quantity of intake air flow to be supplied to the engine can be maintained substantially in the vicinity of a predetermined value according to the invention.

As has been described hereinabove, there is such an advantage in use of the internal combustion engine intake control unit according to the invention that a smooth movement of the throttle valve can be ensured even if deposits accumulate on the surfaces in the downstream thereof since the adverse effect of the deposits can be eliminated by the provision of the arrangement of the invention.

What is claimed is:

1. An intake valve control apparatus for an internal combustion engine, comprising a throttle body member which forms an intake air passage, and a throttle valve which is mounted rotatably in said throttle body member and has a first outer circumference which rotates in a direction upstream of said throttle body member and a second outer circumference which rotates in a direction downstream of said throttle body member, wherein said throttle body member has a spherical surface formed on a first internal wall thereof and opposite to said first outer circumference of said throttle valve; and a cylindrical surface formed on a second internal wall thereof and opposite to said second outer circumference of said throttle valve.

2. An intake valve control apparatus for an internal combustion engine according to claim 1, wherein a first distance which is defined between said first outer circumference of said throttle valve at an idle position and said first internal wall of said throttle body member is equal to a second distance which is defined between said second outer circumference of said throttle valve at the idle position and said second internal wall of said throttle body member.

3. An intake valve control apparatus according to claim 2, wherein said first distance and said second distance are 5 to 10 μm.

4. An intake valve control apparatus according to claim 1, wherein a first distance which is defined between said first outer circumference of said throttle valve at an idle position and said first internal wall of said throttle body member is greater than a greater distance which is defined between said second outer circumference of said throttle valve at the idle position and said second internal wall of said throttle body member.

5. An intake valve control apparatus according to claim 4, wherein said first distance is between about 50 to 100 μm, and said second distance is between about 5 to 10 μm.

6. An intake valve control apparatus according to claim 1, further comprising a lubricating and low friction coating formed in part on surfaces downstream of said throttle valve.

7. An intake valve control apparatus according to claim 6, wherein an area of said coating includes an internal portion of a bearing hole inside said body member for rotatably mounting a throttle shaft which holds said throttle valve, an outer circumference portion of said throttle valve on the side facing downstream of said throttle valve, and an internal wall surface of said body member opposite to the outer circumferences of the throttle valve downstream of said throttle valve.

8. An intake valve control apparatus according to claim 7, wherein said coating has a thickness sized to substantially fill a gap between the outer circumference of said throttle valve and the internal wall surface of said body member.

9. An intake valve control apparatus according to claim 1, further comprising:

a motor for actuating said throttle valve; a sensor for detecting a rotational angle of said throttle valve; and a control means for providing an output in accordance with a displacement of an acceleration pedal to said motor, and controlling rotation of said motor in response to an output signal from said sensor.

10. An intake valve control apparatus according to claim 1, further comprising a multipoint fuel injection system connected with and downstream of the apparatus.

* * * * *